United States Patent
Liu et al.

(10) Patent No.: US 9,781,055 B2
(45) Date of Patent: Oct. 3, 2017

(54) DYNAMIC CASCADED CLUSTERING FOR DYNAMIC VNF

(71) Applicant: CISCO TECHNOLOGY, INC., San Jose, CA (US)

(72) Inventors: Jianda Liu, Shanghai (CN); Xiangyu Ji, Shanghai (CN); Gaofeng Tao, Shanghai (CN); Xiaorong Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 14/462,230

(22) Filed: Aug. 18, 2014

(65) Prior Publication Data

US 2016/0050161 A1 Feb. 18, 2016

(51) Int. Cl.
 *H04L 12/911* (2013.01)
 *H04L 12/721* (2013.01)
 *H04L 12/701* (2013.01)

(52) U.S. Cl.
 CPC ............ *H04L 47/783* (2013.01); *H04L 45/00* (2013.01); *H04L 45/14* (2013.01)

(58) Field of Classification Search
 None
 See application file for complete search history.

(56) References Cited

U.S. PATENT DOCUMENTS

| | | | | |
|---|---|---|---|---|
| 6,286,052 B1 * | 9/2001 | McCloghrie | ........ | H04L 12/5695 370/235 |
| 6,532,237 B1 * | 3/2003 | Or | ........................ | H04L 12/5601 370/250 |
| 6,609,153 B1 * | 8/2003 | Salkewicz | ............... | H04L 12/24 370/352 |
| 7,496,035 B1 * | 2/2009 | Sadasivan | ............... | H04L 47/10 370/235 |
| 7,516,198 B1 * | 4/2009 | Appala | ................... | H04L 45/02 707/999.004 |

(Continued)

FOREIGN PATENT DOCUMENTS

| EP | 2597831 | 5/2013 |
|---|---|---|
| WO | WO 2016/028653 | 2/2016 |

OTHER PUBLICATIONS

PCT Sep. 12, 2015 International Search Report and Written Opinion from International Application Serial No. PCT/US2015/045439; 10 pages.

(Continued)

*Primary Examiner* — Ranodhi Serrao

(57) ABSTRACT

In an example, a server architecture is described for a dynamic cascaded node chain providing a resource cluster. The cascaded node chain may include one or more resource instances provisioned as a head node, zero or more middle nodes, and a tail node. Each node may include a discrete number of available resource entries in a flow table. As traffic enters the head node, each node attempts to match the traffic to an entry in its flow table. If no match is found, the packet is downlinked to the next node in the chain. If the packet reaches the tail node without a match, it is punted to the controller. The controller may then provision a matching entry if an entry is available. If not, the controller may spawn a new resource instance. When the full capacity of the cluster is reached, non-matching entries may be dropped.

20 Claims, 12 Drawing Sheets

(56) References Cited

U.S. PATENT DOCUMENTS

| | | | |
|---|---|---|---|
| 7,526,480 B2* | 4/2009 | Nadeau | H04L 12/4641 |
| 7,865,616 B2 | 1/2011 | Saffre et al. | |
| 8,532,108 B2* | 9/2013 | Li | H04L 12/4633 |
| | | | 370/392 |
| 8,539,079 B2* | 9/2013 | Thireault | G06F 9/5055 |
| | | | 709/203 |
| 8,619,779 B2* | 12/2013 | Li | H04L 12/5695 |
| | | | 370/392 |
| 8,650,218 B2 | 2/2014 | Gandadhar | |
| 8,787,394 B2* | 7/2014 | Bragg | H04L 45/04 |
| | | | 370/401 |
| 8,819,284 B2* | 8/2014 | Nguyen | H04L 45/02 |
| | | | 709/238 |
| 2003/0051051 A1* | 3/2003 | O'Neal | H04L 12/1854 |
| | | | 709/242 |
| 2006/0031439 A1 | 2/2006 | Saffre | |
| 2010/0091773 A1 | 4/2010 | Shyu et al. | |
| 2013/0170435 A1 | 7/2013 | Dinan | |
| 2014/0185627 A1* | 7/2014 | Ditya | H04L 45/44 |
| | | | 370/409 |

OTHER PUBLICATIONS

Zong, N., et al., "Virtualized Network Function (VNF) Pool Problem Statement; draft-zong-vnfpool-problem-statement-06.txt;" Network Working Group Internet Draft, Jul. 1, 2014; 13 pages.
PCT Feb. 21, 2017 International Preliminary Report on Patentability from International Application Serial No. PCT/US2015/045439; 7 pages.

\* cited by examiner

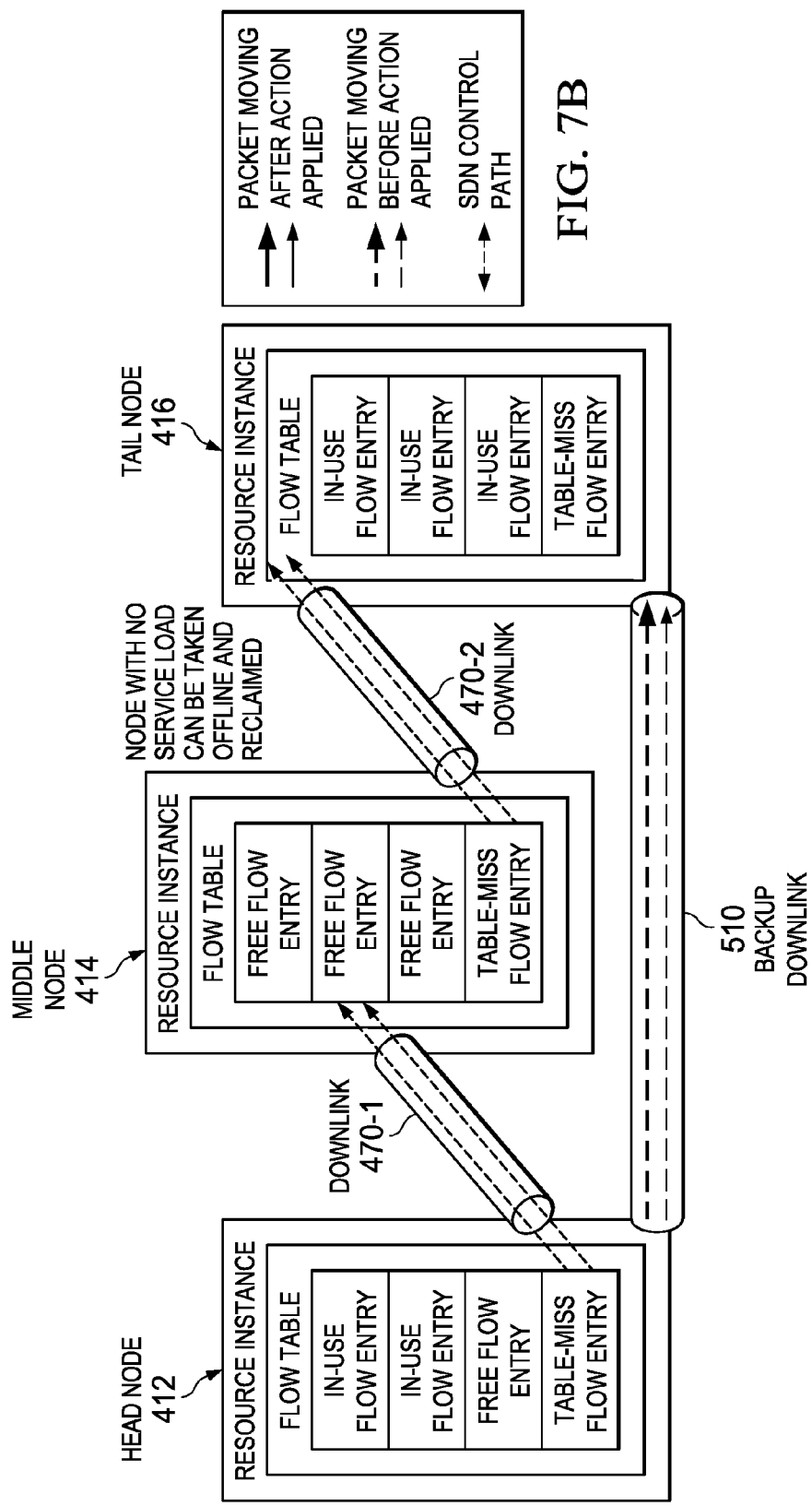

DYNAMIC CASCADED CLUSTERING FOR DYNAMIC VNF

FIELD OF THE DISCLOSURE

This application relates to the field of network services, and more particularly to a dynamic cascaded clustering for a dynamic virtualized network function (VNF).

BACKGROUND

Contemporary network topologies may require the provisioning of a multitude of different types of resources. As network packets reach an enterprise, for example, each packet may need to be subjected to a number of discrete services in a node chain. As the level of traffic increases, additional servers may be brought online to handle the additional traffic. These may be provided, for example, by dedicated or standalone network appliances like firewalls, routers, and spam filters.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 7A and 7B are a block diagram of dynamic cascaded cluster according to one or more examples of the present Specification.

DETAILED DESCRIPTION OF THE EMBODIMENTS

Overview

Figure 1:
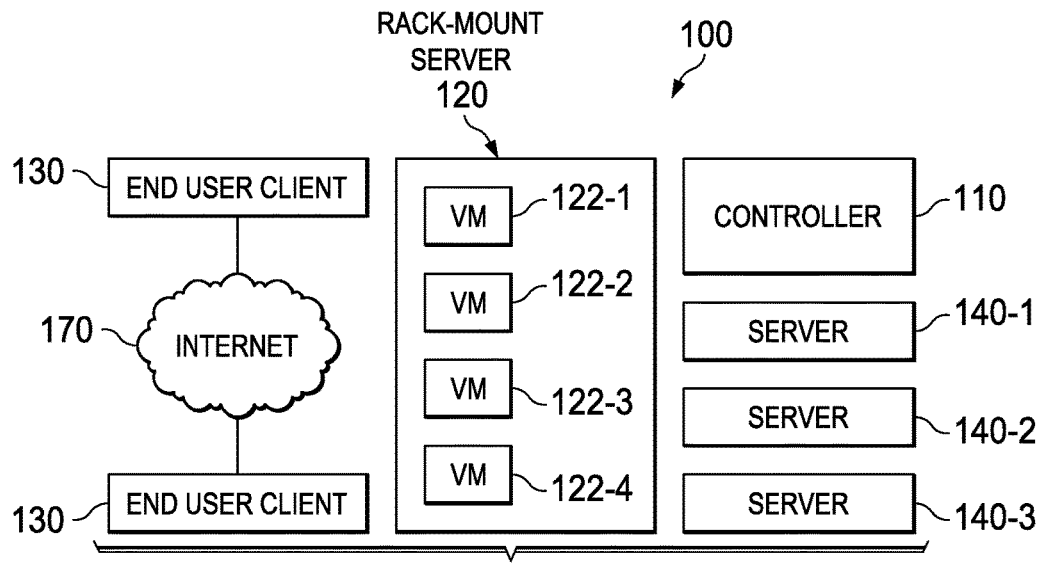
FIG. 1 is a block diagram of a distributed network environment according to one or more examples of the present Specification.

In an example, a server architecture is described for a dynamic cascaded node chain providing a resource cluster. The cascaded node chain may include one or more resource instances provisioned as a head node, zero or more middle nodes, and a tail node. Each node may include a discrete number of available resource entries in a flow table. As traffic enters the head node, each node attempts to match the traffic to an entry in its flow table. If no match is found, the packet is downlinked to the next node in the chain. If the packet reaches the tail node without a match, it is punted to the controller. The controller may then provision a matching entry if an entry is available. If not, the controller may spawn a new resource instance. When the full capacity of the cluster is reached, non-matching entries may be dropped.

In a first example, there is disclosed a network device comprising a first network interface for communicatively coupling to a data network; a second network interface for communicatively coupling to a data plane comprising one or more resource instances in a cascaded node chain; and a resource controller engine operable for receiving a network flow on the first network interface; sending the network flow to the data plane over the second network interface; receiving the network flow back from the data plane; and provisioning a flow entry on a resource instance to match the network flow.

In a second example, there is disclosed A method of providing a virtualized network function, comprising receiving a network flow on the first network interface; sending the network flow to the data plane over the second network interface; receiving the network flow back from the data plane; and provisioning a flow entry on a resource instance to match the network flow.

In a third example, there is disclosed or more computer-readable mediums having stored thereon executable instructions operable for instructing a processor for providing a virtualized network function, comprising receiving a network flow on the first network interface; sending the network flow to the data plane over the second network interface; receiving the network flow back from the data plane; and provisioning a flow entry on a resource instance to match the network flow.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In an example architecture, an enterprise may deploy multiple services at the edge of one or more branch offices. However, the enterprise may find the cost of a dedicated standalone appliance at least partly unsuitable, for example because it is per-feature prohibitive, inflexible, slow to install, and/or difficult to maintain in certain embodiments. In other embodiments, the functionality may be provided by an integrated access router, providing only a limited feature set. As the enterprise evolves, services and applications may migrate to the enterprise data center or to public clouds, thus driving changes in the enterprise network architecture. Additional challenges may be found in so-called "bring your own device" (BYOD) environments, where users are permitted to provide their own preferred computing devices. This may require the application of additional network services to ensure network security and integrity, and to guard against data loss or leakage.

To cost-effectively address these data needs, an enterprise may provide services via network function virtualization (NFV) rather than on customer-premises equipment (CPE). A network function virtualization infrastructure (NFVI) provides one or more services as a virtualized network function (VNF). It should be understood that in this context, a "service" is to be construed broadly to include any service or action that can be applied to network packets, such as, by way of non-limiting example, domain name system (DNS) translation, directory services, e-mail, printing, file services, time services, voice over internet protocol (VoIP), authentication, routing, firewalls, zone firewalls, application firewalls, deep packet inspection, antivirus, spam filtering, antimalware, quality of service, netflow, wide-area application services, network address translation, IP security, NAT, IPSec, and application visibility and control.

This kind of NFV may enable a service provider to operate a VNF instance using its NFVI, which provides the functionality required to implement the enterprise CPE and potentially another VNF instance for its own PE router. So rather than the enterprise investing its own capital in deployment of networking infrastructure, a service provider may be able to provide advanced networking features as a measured service on an expense basis.

As the enterprise's business grows, the usage of the VNF instances may increase. But with specialty of network services, adding more VNF instances may impact the entire topology, which is not acceptable in certain contexts. This may drive the service provider to seek out a solution for scaling out NFVI resource instances allocated to one VNF instance, and at the same time dynamically manage those resources.

On option for this is a full mesh topology to synchronize service states across resource instances providing the service, so that each instance can handle any packet from any bi-directional data flow, even when the flow is asymmetric. However, this method requires low latency between instances to guarantee the order of messages and the consistency of service states. Meanwhile, each packet may trigger N−1 messages to synchronize state among N instances, which in some cases will not have acceptable efficiency and may result in unacceptably high consumption of CPU cycles. These problems may be exacerbated as the number of resource instances increases.

Another option is a "star" topology, in which a centralized dispatcher diverts packets to resource instances according to its CPU load or memory usage, and then the servicing resource instance returns packets to the dispatcher to be forwarded out. This topology may be unsuitable in certain contexts, however, because the dispatcher becomes a bottleneck and single failure point, as it operates both the data plane and control plane.

Certain embodiments of a cascaded node chain, in which resource instances are dynamically provisioned, and in which the control plane is separated from the data plane, may offer advantages over the full-mesh topology and star topology. In the cascaded node chain, a cluster of resource instances are provided on the data plane, along with a controller on the control plane. The cascaded node chain may include one or more resource instances provisioned as a head node, zero or more middle nodes, and a tail node. Each node may include a discrete number of available resource entries in a flow table. As traffic enters the head node, each node attempts to match the traffic to an entry in its flow table. If no match is found, the packet is downlinked to the next node in the chain. If the packet reaches the tail node without a match, it is punted to the controller. The controller may then provision a matching entry if an entry is available. If not, the controller may spawn a new resource instance. When the full capacity of the cluster is reached, non-matching entries may be dropped.

FIG. 1 is a network level diagram of a distributed computing system 100 according to one or more examples of the present Specification. In distributed computing system 100, one or more end-user clients 130 connect via Internet 170 to one or more server class computing devices. Server class computing devices may include, by way of nonlimiting example, rackmount server 120, controller 110, and one or more standalone servers 140, such as standalone servers 140-1, 140-2, and 140-3. In an example, end-user clients 130 are provided with client software to access computing resources on server class computers.

In this example, rackmount server 120 includes a plurality of virtual machines 122, namely virtual machine 122-1, virtual machine 122-2, virtual machine 122-3, and virtual machine 122-4. It should also be noted that rackmount server 120 may provide a hypervisor environment, so that virtual machines 122 can be dynamically provisioned according to loads and real-time needs. Controller 110 may also be provided with workload server functionality, configured to usefully distribute server tasks among a plurality of server-class computers, such as virtual machines 122 and standalone servers 140.

Figure 2:
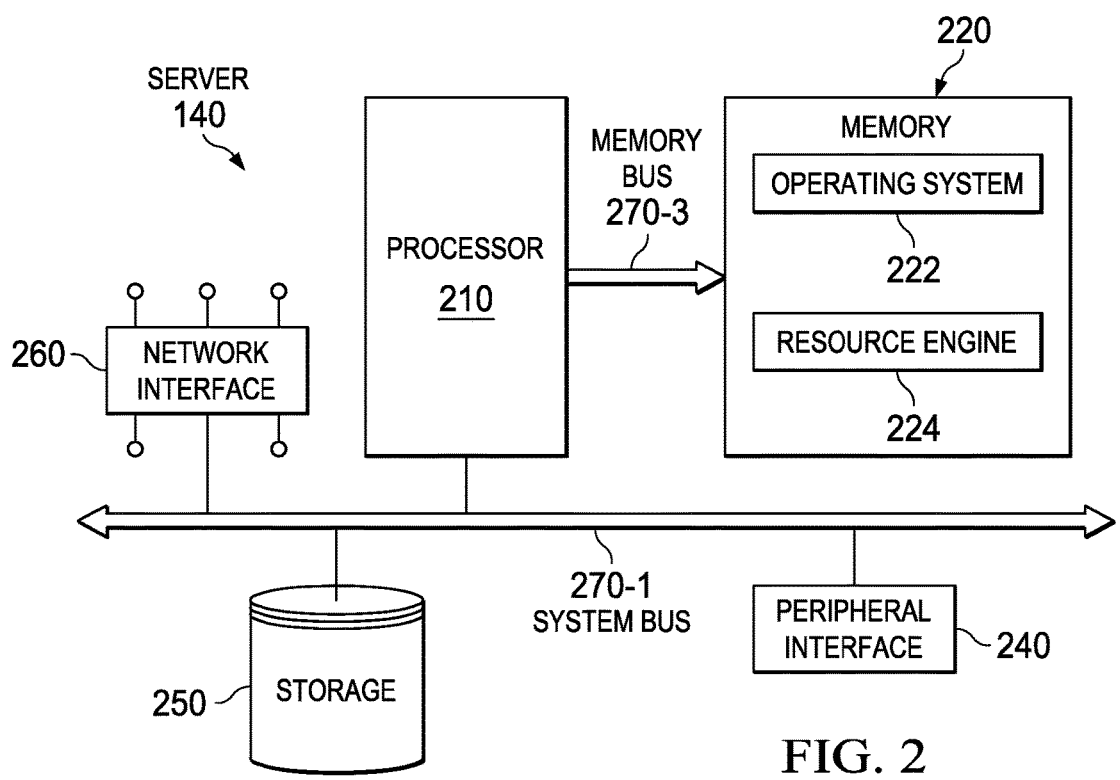
FIG. 2 is a block diagram of a computing device according to one or more examples of the present Specification.

FIG. 2 is a block diagram of server 140 according to one or more examples of the present Specification. Server 140 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data.

Server 140 includes a processor 210 connected to a memory 220, having stored therein executable instructions for providing an operating system 222 and resource engine 224. Other components of server 140 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of resource engine 224. Many other configurations are also possible, and are intended to be encompassed within the broad scope of this Specification.

Network interface 260 may be provided to communicatively couple server 140 to a wired or wireless network. A "network," as used throughout this Specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Resource engine 224, in one example, is a utility or program that carries out a method, such methods described in connection with resource instances (see, e.g., FIGS. 4-12) throughout this Specification, or other methods according to this Specification. Resource engine 224 may be, in various embodiments, embodied in hardware, software, firmware, or some combination thereof. For example, in some cases, resource engine 224 may include a special integrated circuit designed to carry out a method or a part thereof, and may also include software instructions operable to instruct a processor to perform the method. In some cases, resource engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that resource engine 224 is provided by way of non-limiting example only, and that other hardware and software, including interactive or user-mode software, may also be provided in conjunction with, in addition to, or instead of resource engine 224 to perform methods according to this Specification.

In one example, resource engine 224 includes executable instructions stored on a non-transitory medium operable to perform resource instance methods according to this Specification. At an appropriate time, such as upon booting server 140 or upon a command from operating system 222 or a user 120, processor 210 may retrieve a copy of resource engine 224 (or software portions thereof) from storage 250 and load it into memory 220. Processor 210 may then iteratively execute the instructions of resource engine 224.

Peripheral interface 240 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
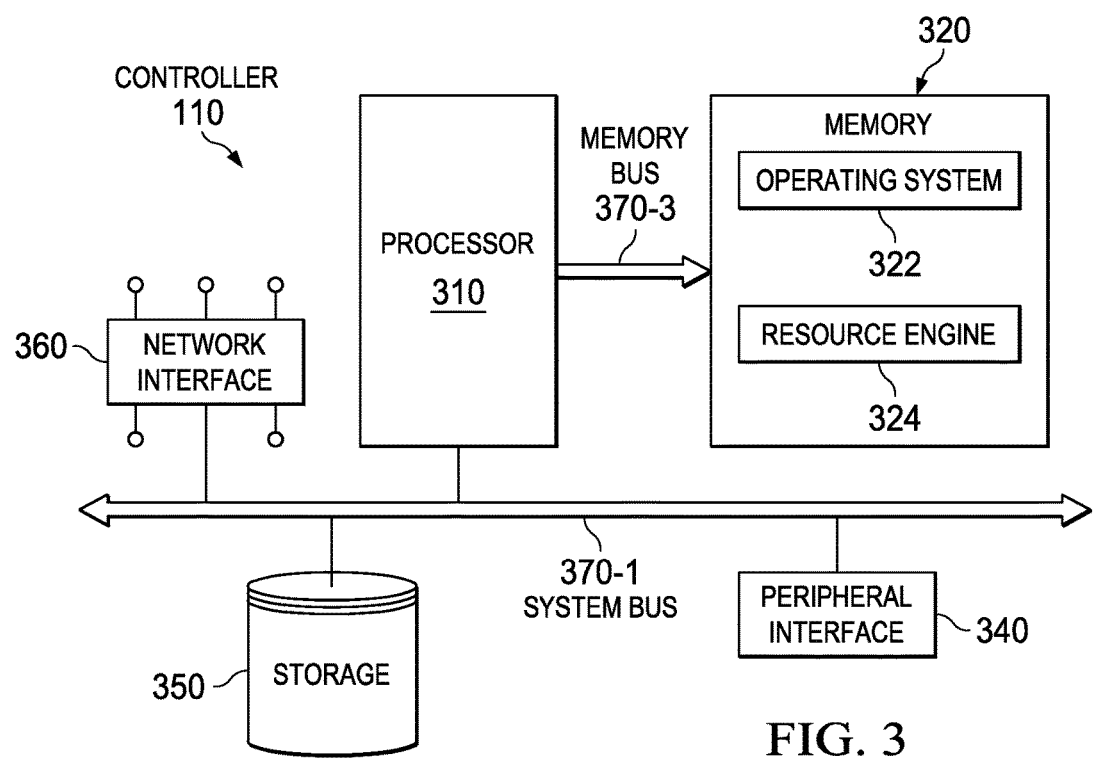
FIG. 3 is a block diagram of dynamic cascaded cluster according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and resource controller engine 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of resource controller engine 324. Many other configurations are also possible, and are intended to be encompassed within the broad scope of this Specification.

Network interface 360 may be provided to communicatively couple server 140 to a wired or wireless network. A "network," as used throughout this Specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Resource controller engine 324, in one example, is a utility or program that carries out a method, such as methods described in connection with controller 110 throughout this Specification, or other methods according to this Specification. Resource controller engine 324 may be, in various embodiments, embodied in hardware, software, firmware, or some combination thereof. For example, in some cases, resource controller engine 324 may include a special integrated circuit designed to carry out a method or a part thereof, and may also include software instructions operable to instruct a processor to perform the method. In some cases, resource controller engine 324 may run as a daemon process, as described above. It should also be noted that resource controller engine 324 is provided by way of non-limiting example only, and that other hardware and software, including interactive or user-mode software, may also be provided in conjunction with, in addition to, or instead of resource controller engine 324 to perform methods according to this Specification.

In one example, resource controller engine 324 includes executable instructions stored on a non-transitory medium operable to perform the methods described in connection with controller 110, or a similar method according to this Specification. At an appropriate time, such as upon booting server 140 or upon a command from operating system 322 or a user 120, processor 310 may retrieve a copy of resource controller engine 324 (or software portions thereof) from storage 350 and load it into memory 320. Processor 310 may then iteratively execute the instructions of resource controller engine 324.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4:
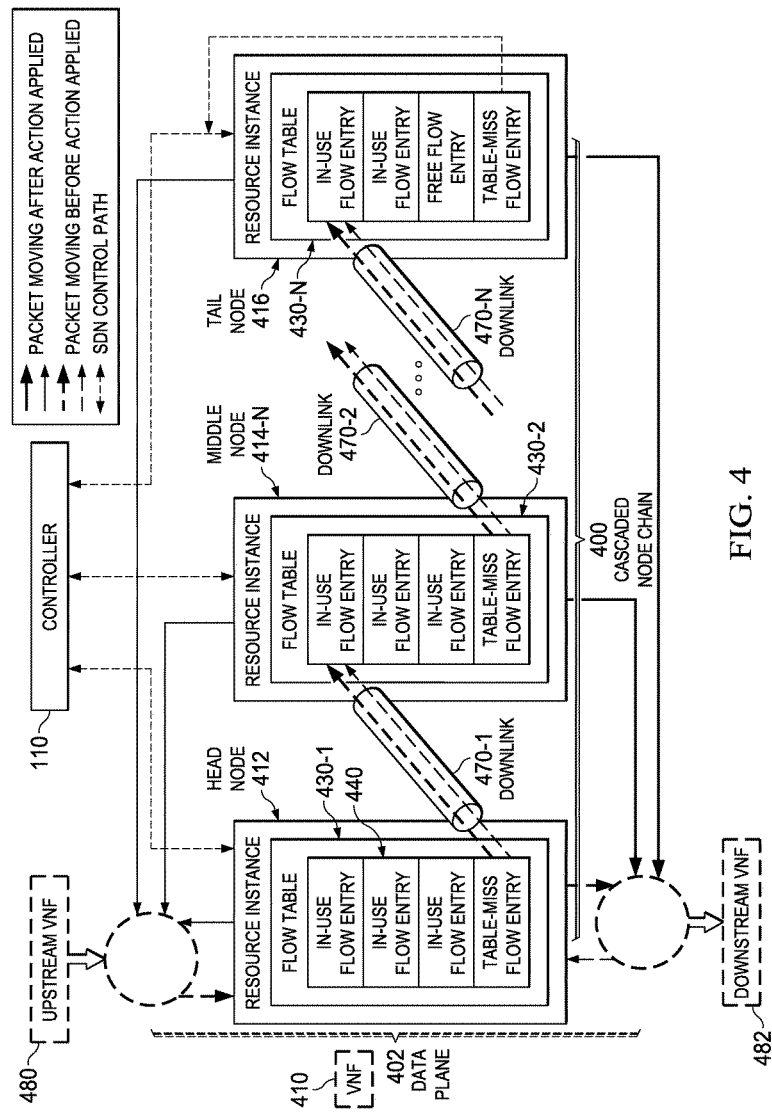
FIG. 4 is a block diagram of dynamic cascaded cluster according to one or more examples of the present Specification.

FIG. 4 is a block diagram of a VNF cluster 410 according to one or more examples of the present Specification. VNF cluster 410 may be provided on any of the server class computing devices of FIG. 1, including a virtual machine 122 of rackmount server 120, or a standalone server 140. In other examples, a standalone server 140 may also be provisioned with a hypervisor or other virtual machine so that it may provide more than one VNF. Thus it should be noted that VNF 410 is conceptually embodied as any combination of hardware and/or software configured to provide the functions described herein, regardless of the level of abstraction. For example, unless otherwise expressly specified, it may be considered for purposes of this Specification that a virtual machine having a virtual memory area and a virtual processor is the equivalent of a standalone machine having a physical processor and physical memory. Indeed, as the popularity of network virtualization increases, it is more common for a network function to be provided on a virtual machine then on a standalone physical hardware device. Nevertheless, it is anticipated herein that VNF provisioning may include any suitable function, including for example launching a new virtual machine instance from a hypervisor, booting an existing virtual machine from an existing image, bringing online a physical server already configured to provide the VNF, or booting a physical device from a pre-existing image configured to provide the network function, by way of non-limiting example.

In this example, VNF cluster 410 is part of a work stream. An upstream VNF 480 and a downstream VNF 482 may also be provided as part of the work stream. The work stream may be defined as a logical work flow. For example, upstream VNF 480 may be a load balancer, VNF cluster 410 may provide a firewall, and downstream VNF 482 may be configured to provide web services. In that case, the path from upstream VNF 480 to VNF cluster 410 to downstream VNF 482 may not be based on a physical network path, but rather may be based on a service chain defined by a network administrator. Thus it should be noted that the positioning of upstream VNF 480, VNF cluster 410, and downstream VNF 482 with respect to each other need not represent any particular physical arrangement or even logical arrangement. Rather, the arrangement is configured to represent a useful workflow in which desired services are applied to a network packet or a group of network packets in a logical and useful order.

VNF cluster 410 is provisioned for a resource, such as providing a particular service, which may include by way of non-limiting example, any of the services disclosed herein. VNF cluster 410 may be designed to be provisioned in zero or more instances. In this case, head node 412 provides a first resource instance. Zero or more middle nodes 414-N may provide zero or more additional instances. Finally, a tail node 416 provides a final resource instance. It should be noted that this arrangements again need not be a specific physical or logical arrangement, but rather designates a useful organization of resource instances. In some cases, only one resource instance is provided. In that case, head node 412 may be the same as tail node 416. In other cases, only two resource instances are provided. In that case, head node 412 also serves as middle node 414, while tail node 416 may serve as either middle node 414 or tail node 416. It should be noted however, that in some cases it is useful to class resource instances into three classes with head node 412 and middle node 414 potentially overlapping. Thus, an example taxonomy classifies a node as either a tail node 416, or not a tail node. If not a tail node, then the node may be a head node 412, a middle node 414, or both. In this taxonomy, a head node and a tail node share in common the attribute that each may include a downlink 470 to the next node in the cascade. Tail nodes 416, on the other hand, do not have a downlink 470.

Head node 412 includes a flow table 430-1. Flow table 430-1 includes zero or more in-use flow entries 440. Flow table 430-1 may also provide a table miss flow entry. If a table miss flow entry is encountered, then a downlink 470-1 may be provided to middle node 414-N.

In certain examples, middle node 414-N and tail node 416 may be essentially clones of head node 412. It should be noted that in an example embodiment, VNF cluster 410 provides only one distinct network resource, and nodes are dynamically provisioned according to network loads and demand.

Head node 412 has a finite capacity for handling network traffic, and thus may eventually become exhausted under increased network loads. Thus, additional instances may be necessary to handle increased traffic. Each resource load instance (where a "load instance" may represent, for example, the handling of a discrete network packet or group of network packets) may occupy zero or more in-use flow entries 440 of flow table 430-1. When all of the resource load instances have been exhausted (i.e., the resource instance is handling all or nearly all the volume of traffic it is configured to handle or capable of handling), it is desirable to spawn a new resource instance to handle additional traffic.

For example, when head node 412 has exhausted all of its resource load instances, it is desirable to spawn a new node. In that case a tail node 416 may be spawned. It should be noted that in this instance, head node 412 is the only non-tail node. When tail node 416 has used up all of its instances, it is desirable to spawn a new tail node 416. In that case, the previous tail node 416 becomes middle node 414-1. If tail node 416 then exhausts all of its resource load instances, it is desirable to spawn a new tail node 416. In that case, head node 412 and middle node 414-1 retain their identities. Previous tail node 416 becomes new middle node 414-2, and the new instance becomes tail node 416.

The control of spawning new resource instances is managed in part by controller 110, and is possible because resource instances are able to coordinate with controller 110.

In the example architecture of this FIGURE, the control plane and data plane are separated from one another. As used herein, the concepts of a "control plane" and "data plane" represent a logical separation of network functions, and it should be noted that they need not be presented on separate interfaces or on separate physical signaling planes. Rather, the control plane and data plane may simply use different signaling protocols, different ports, and/or different commands.

Specifically, controller 110 handles coordination functions on the control plane. Other resource instances in the cluster operate on the data plane and may be used to handle network traffic and provide desired services. For example, control plane devices may dispatch packets or handle load sharing by way of non-limiting example. In this example, no dedicated dispatcher is needed to synchronize flow states between resource instances.

VNF cluster 410 includes a series of cascade connected resource instances 412, 414, 416 in the data plane, and controller 110 in the control plane. According to the topology of FIG. 4, data plane 402 of VNF cluster 410 comprises a cascaded node chain. Resource instances in data plane 402 may be defined as nodes of the chain, and as described above may be classified as one of head node 412, middle node 414, or tail node 416. A cluster may contain one head node 412, one tail node 416, and 0-N middle nodes 416. When a cluster only contains one node, the single node will act as both the head node and tail node. Head nodes 412 and middle nodes 414 have one downlink port 470 connected to the next element of the cascaded node chain. Downlink 470 can be either a physical port or logical port.

In an example architecture, head node 412 is the only node the cascaded node chain 400 that is configured to receive packets from outside the cluster. A middle node 414 or tail node 416 receives packets from the previous node in its chain. All three species of node 412, 414, 416 may be configured to receive packets from controller 110.

When a packet is passed to any node in cascaded node chain 400, the node may first perform a flow lookup in its flow table 430. In one example, each entry 440 in flow table 430 is of one of three species:

In-use flow entry;
Table miss flow entry; and
Free flow entry.

An in-use flow entry is installed by controller 110, either beforehand or dynamically, and may include a specified action set. The number of in-use flow entries 440 provisioned on a node 412, 414, 416 may be determined by the overall capacity of that node. For example, when head node 412 encounters a packet that matches an in-use flow entry, the action of that entry is applied. For example, if VNF 410 is a firewall, an incoming packet may be checked against an in-use flow entry of head node 412. If the packet matches the criteria of the in-use flow entry, then head node 412 will apply the action previously specified by controller 110 when the flow entry 440 was set up. Note that this action is performed only if the flow entry 440 is not already handling a packet. If it is, then the packet may be handed off to another flow entry 440. Thus, flow table 430 may, in one example, have an array of essentially identical flow entries, representing a discrete number of incoming packets that can be simultaneously handled by head node 412.

After head node 412 has applied the action to the incoming packet, the packet may be forwarded to upstream service 480 or downstream service 482 for additional processing. Because VNF 410 provides multiple instances of a single network function, there may not be any need for more than one flow entry 440 in the entire cascaded node chain 440 to handle a particular packet. In other words, the example of this figure is directed at a cascaded node chain 400 providing, in parallel, multiple instances of a single service. In other examples, single instances of multiple services, or multiple instances of multiple services could also be provisioned.

Each flow table 430 also has installed therein one table-miss flow entry. The table-miss flow entry may have the lowest priority (0) and may be configured to match any packet that does not match any other flow entries. In an example, the table-miss entry of a flow table cannot be replaced, but its action may be modified by controller 110. When a packet matches the table-miss flow entry, the table-miss action may be applied as follows:

For head node 412 and middle nodes 414:

If the node's capacity has never been filled, "Punt to Controller";

If the node's capacity has been fully utilized at least once, (reached a "full" watermark), controller 110 sets the table-miss action to "Send to Downlink," so that the packet will always be sent to the next node in the chain.

For tail node 416:

If the node's capacity has never been filled, "Punt to Controller";

When capacity of the full cluster of cascaded node chain 400 is full, to avoid unnecessary traffic to controller 110, the action may be set to "Drop";

When the cluster of cascaded node cha in 400 includes only one node, the table-miss action of the node will be the same as that for a tail node 416.

Free-flow entries are special entries that cannot match any packet on a flow lookup. Rather, free flow entries are used to track the remaining capacity of a node.

In the foregoing example, controller 110 must know the topology of the cluster so it can know the category of each node in cascaded node chain 400. Controller 110 may also be tasked with updating flow tables 430 for each node 412, 414, 416 in cascaded node chain 400. Depending on the configuration, controller 110 may or may not maintain records of existing flows passing through the cluster.

Controller 110 may also be responsible for detecting "Capacity Full" events based on pure statistics (from Controller 110's point of view), or based on error messages reported by other network entities in the cluster. Controller 110 also maintains an "Available Nodes List," which it may use to determine which nodes have available capacity.

Controller 110 may be configured to respond to several species of packet-less events, including "Capacity Full," "Flow Delete," "Loss of Connectivity," "Cluster Capacity High Usage," and "Node Idle" by way of non-limiting example.

Responsive to a "Capacity Full" event, controller 110 may:

If the node is a head node 412 or middle node 414, and this is the first instance of a "Capacity Full" event, update the node's table-miss action to "Send to Downlink."

Remove the node from controller 110's "Available Nodes List."

If cascaded node chain 400 has reached its overall full capacity, update the table-miss flow entry for tail node 416 to "Drop."

Responsive to a "Flow Delete" event, controller 110 may:

Add the reporting node to controller 110's "Available Nodes List." This may be a sorted list, and the node may be added in the same order as its position within cascaded node chain 400.

If tail node 416's current table-miss flow action is set to "Drop," update it to "Punt to Controller."

Figure 5:
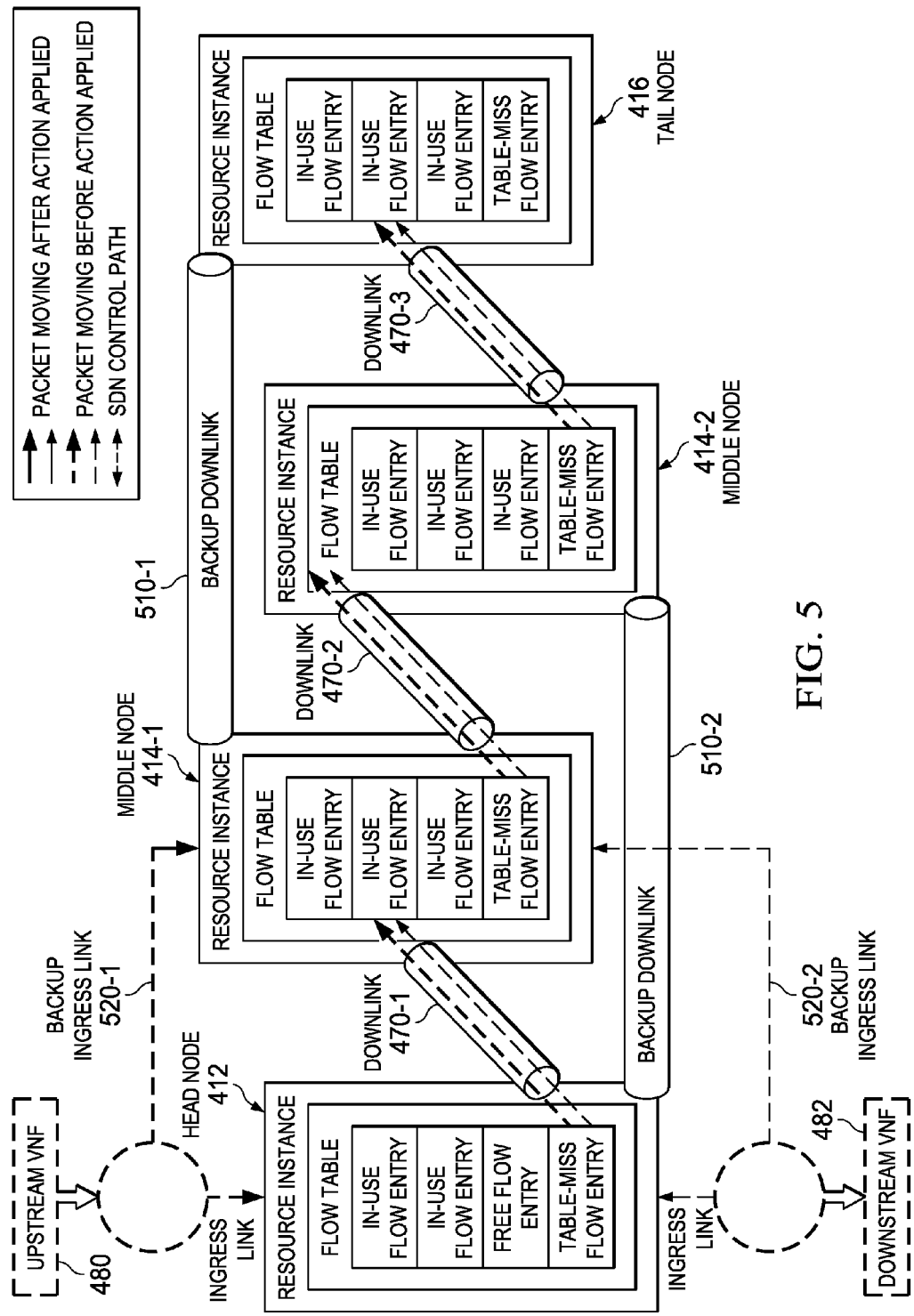
FIG. 5 is a block diagram of dynamic cascaded cluster according to one or more examples of the present Specification.

Responsive to a "Loss of Connectivity" event, controller 110 may perform a fast failover, which is described more particularly in connection with FIG. 5.

Responsive to a "Cluster Capacity High Usage" event, controller 110 may dynamically add new network entities to the cluster's data plane, as described below.

Responsive to a "Node Idle" event, controller 110 may elect to take the reporting node offline to save operating expenses, as described below.

When a node punts a packet to controller 110, if controller 110 is configured to maintain records of existing flows it may:

If the packet belongs to a flow unknown to controller 110:

If the punting or reporting node is not a tail node 416, setup an in-use flow entry on the punting node.

If the punting node is a tail node 416:

Find the first node in the "Available Nodes List" that has a free flow entry, and setup an in-use flow entry on the node.

If the "Available Nodes List" is empty, meaning the capacity of the whole cluster is full, update tail node 416's table-miss action to "Drop."

Normally, the packet should not belong to a node already known to controller 110. However, if this happens, check connectivity for all nodes in cascaded node chain 400.

When a packet is punted to controller 110 and it is not configured to keep records of existing flows, controller 110 may:

If the punting or reporting node is not a tail node 416, setup an in-use flow entry on the punting node.

If the punting node is a tail node 416:

Find the first node in the "Available Nodes List" that has an available free flow entry, and setup an in-use flow entry on that node.

If the "Available Nodes List" is empty, meaning the capacity of the whole cluster is full, update tail node 416's table-miss action to "Drop".

Figure 6:
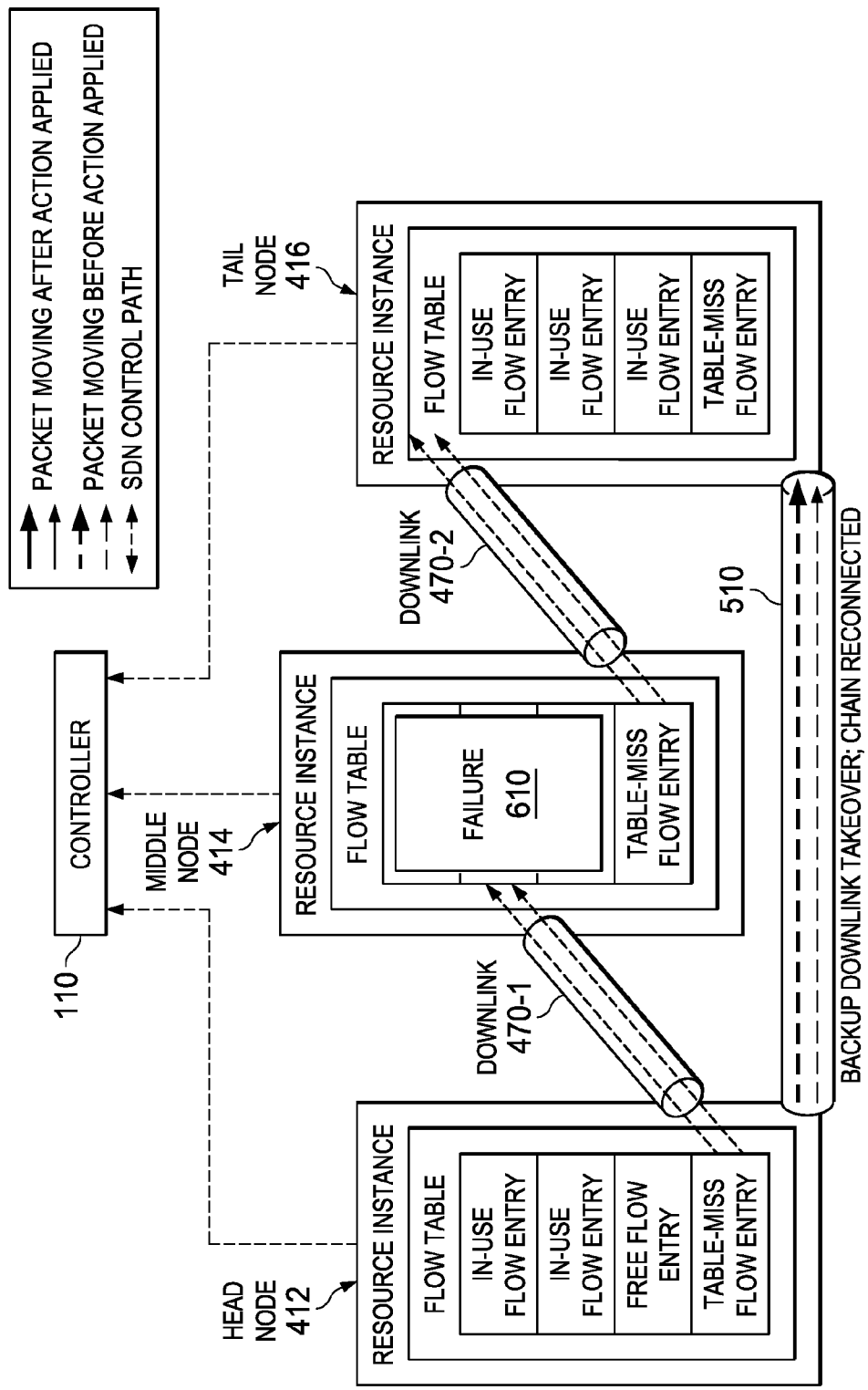
FIG. 6 is a block diagram of dynamic cascaded cluster according to one or more examples of the present Specification.

FIGS. 5 and 6 provide block diagrams of fast failover in a cascaded node chain according to one or more examples of the present Specification. In this example, cascaded node chain 400, providing VNF 402, and upstream VNF 480 and downstream VNF 482 are disclosed substantially as they appear in FIG. 4. Controller 110 is omitted from this drawing for convenience of the drawing, but may still be present in certain embodiments. In this example, cascaded node chain 400 includes four nodes, namely head node 412, tail node 416, and middle nodes 414-1 and 414-2.

Also disclosed in this example, each node includes a backup downlink 510 to at least one other node, for example a node two places removed from itself. Specifically, head node 412 includes backup downlink 510-2 to middle node 414-2. Middle node 414-1 includes backup downlink to tail node 416. Backup downlinks 510 provide for fast failover as described herein, ensuring that no node may act as a single point of failure.

Controller 110 may prospectively establish backup downlinks 510 (i.e., before they are needed). This ensures a robust chain to protect against any single node failure.

Controller 110 may monitor the connectivity of nodes in the cascaded node chain. If one node goes down, controller 110 may perform node protection by immediately removing the failed node from the chain and connecting the preceding node to the next node in the chain. For example, if middle node 414-1 fails, because controller 110 has previously established backup downlink 110, controller 110 may immediately downlink head node 412 to middle node 414-2.

Head node 412 represents a special case because there is no node in front of it. So if head node 412 fails, a new ingress link needs to be provided to middle node 414-1, which will then change its role and become head node 412. To facilitate this, controller 110 may establish backup ingress links 520 to middle node 414-1. Specifically, upstream VNF 480 may have backup ingress link 520-1 to middle node 414-1, and downstream VNF 482 may have backup ingress link 520-2 to middle node 414-1.

Tail node 416 does not need any special connections because in case of failure of tail node 416, controller 110 can simply designate middle node 414-2 as the new tail node 416.

This procedure is illustrated in FIG. 6. In this example, head node 412, middle node 414, and tail node 416 are connected to controller 110. Head node 412 includes downlink 470-1 to middle node 414. Middle node 414 includes downlink 470-2 to tail node 416. Head node 412 also includes a backup downlink 510 to tail node 416. During operation, failure 610 occurs on middle node 414. Upon failure 610, backup downlink 510 takes over the connection, keeping the chain connected. Any flows that were assigned to middle node 414 need to be reinstalled on another node, or on middle node 414 if it can later be brought back online. But in the interim, other flows on other nodes will not timeout and can be maintained.

Figure 7A:
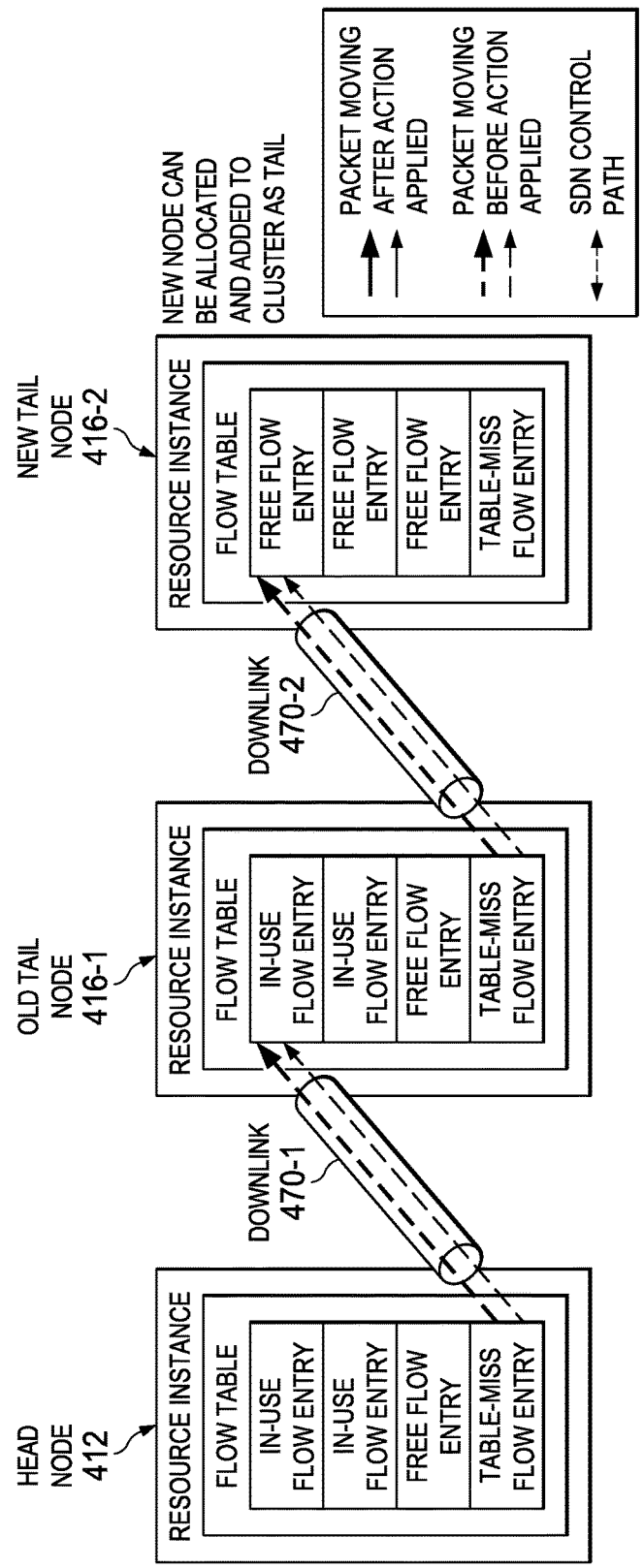
Figure 8:
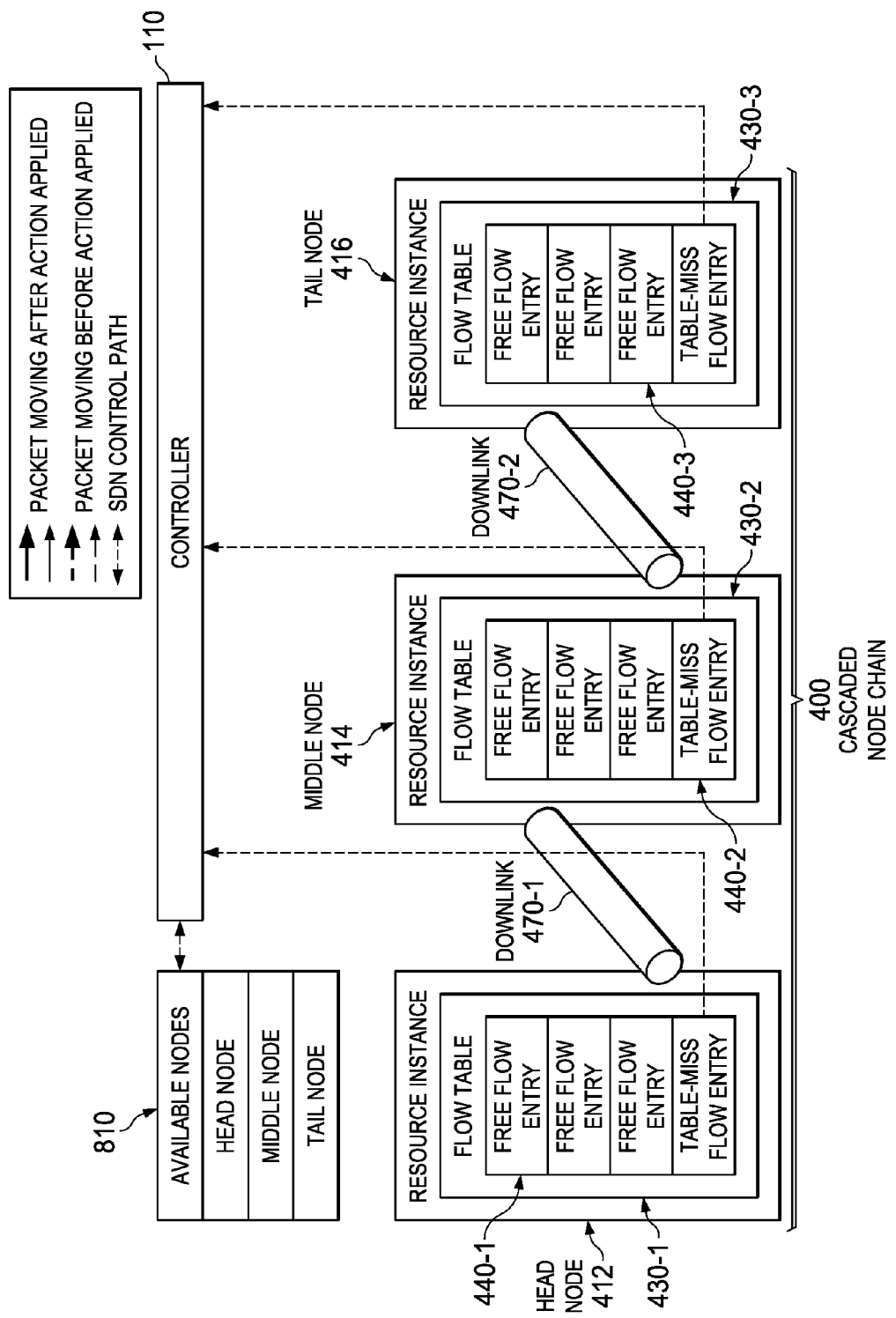
FIG. 8 is a block diagram of dynamic cascaded cluster according to one or more examples of the present Specification.

FIGS. 7A and 7B provide a block diagram illustrating dynamic resource allocation and reclamation according to one or more examples of the present Specification.

In FIG. 7A, cascaded node chain 400 is again shown, with initially a head node 412, and a tail node 416-1, connected by downlink 470-1. Cascaded node chain 400 encounters a situation, such as increased traffic, where additional capacity is needed. In this case, a new tail node 416-2 can be brought online. This may comprise, for example, provisioning and booting a new virtual machine, reconfiguring an existing virtual machine, and/or powering on (and configuring as necessary) a physical machine. A downlink 470-2 is established from old tail node 416-1 to new tail node 416-2.

The result can be seen in FIG. 7B. Head node 412 retains its former position. Old tail node 416-1 has been re-designated middle node 414, with downlink 470-1 flowing from head node 412. Middle node 414 has a downlink 470-2 to tail node 416, which was previously designated as "new" tail node 416-2. A backup downlink 510 is also established from head node 412 to tail node 416.

However, the burst of traffic that required new tail node 416-2 to be brought online may prove to be temporary, or may recede after a period of peak traffic. New tail node 416-2 may then become redundant and unnecessary. As traffic wanes, controller 110 may divert traffic away from middle node 414 when it is reasonable to do so. Once middle node 414 is completely idle, middle node 414 can be powered down and removed from the data plane of cascaded node chain 400. Backup downlink 510 then takes over (similar to the case of a failure) to seamlessly maintain connectivity. Now head node 412 and tail node 416 (formerly new tail node 416-2) are the only nodes in the chain. Middle node 414 (formerly old tail node 416-1) is available for other resource demands (for example, it may be added to a cascaded node chain of upstream VNF 480 or downstream VNF 482), or to simply save operational expenses.

FIGS. 8-12 are a block diagram of a workflow in a cascaded node chain according to one or more examples of the present Specification.

In this example, cascaded node chain 400 includes three nodes: head node 412, middle node 414, and tail node 416. Head node 412 links to middle node 414 via downlink 470-1. Middle node 414 links to tail node 416 via downlink 470-2.

Head node 412 includes flow table 440-1. Middle node 414 includes flow table 440-2. Tail node includes flow table 440-3. In this example, each flow table 440 includes four table entries, and each identically includes three free flow entries and one table miss entry.

Controller 110 maintains its own table 810 of available nodes. Initially, available node table 810 lists head node 412, middle node 414, and tail node 416.

In this example, a three-node embodiment is used for illustrative purposes. Each node has a flow table with four entries, including a table-miss entry. Initially, each node has three free flow entries, and one table-miss flow entry.

Figure 9:
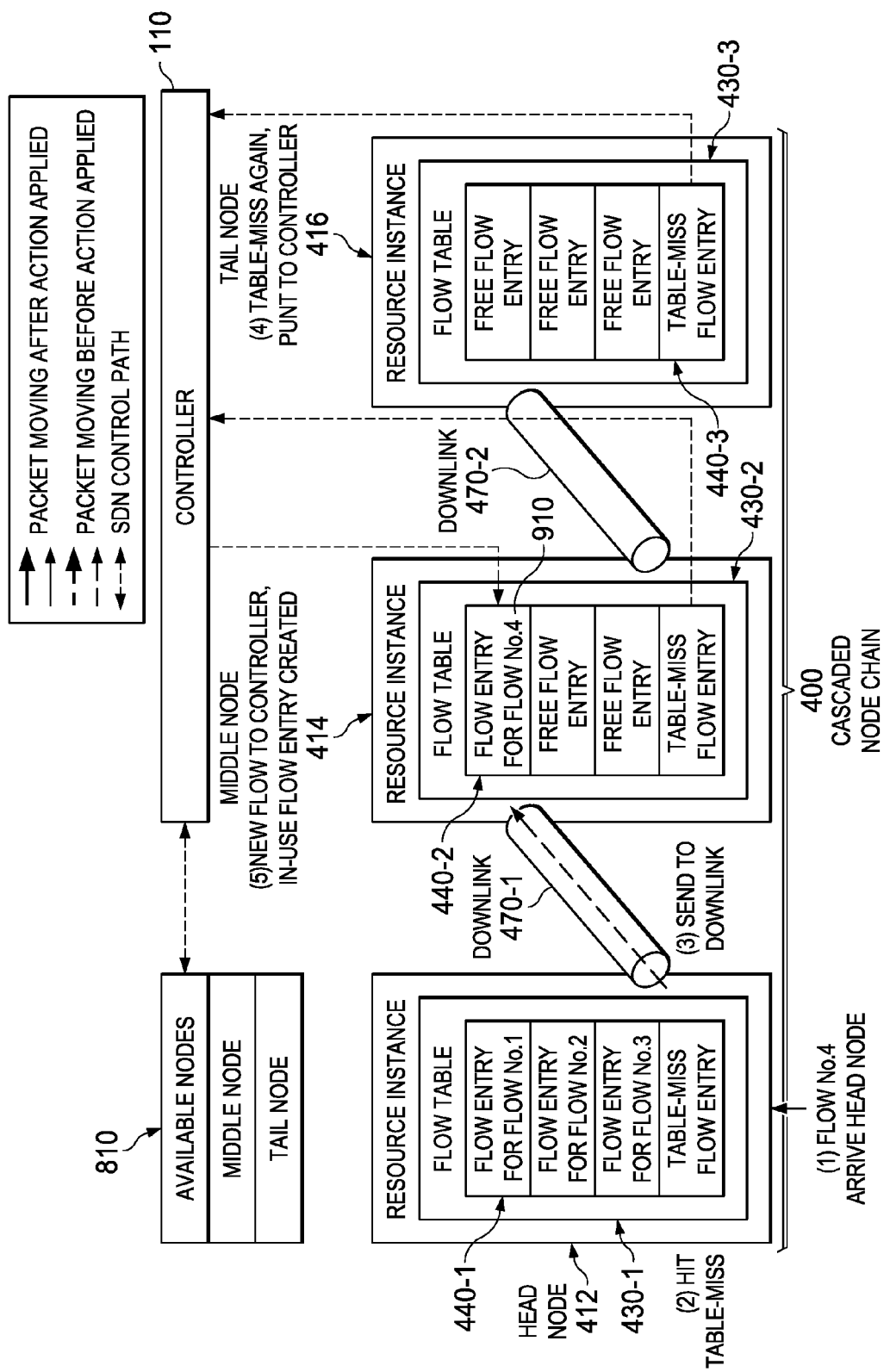
FIG. 9 is a block diagram of dynamic cascaded cluster according to one or more examples of the present Specification.

In FIG. 9, controller 110 provisions four new flows on cascaded node chain 400. By way of example, prior to FIG. 9, three flows (flow 1, flow 2, and flow 3) have arrived at cascaded node chain 400, and have been assigned flow entries. Flow entry 1, flow entry 2, and flow entry 3 have been provisioned on available entries of flow table 440-1 of head node 412. Head node 412 is now full, and controller 110 removes head node 412 from its available nodes table 810.

At item (1), flow 4 arrives at head node 412.

At item (2), flow 4 cannot match any of the in-use flow entries, so it hits the table-miss flow entry of flow table 440-1. This entry has been modified to downlink 470-1.

At item (3), flow 4 is sent to downlink 470-1. Flow entry 910 has not yet been provisioned, so flow 4 does not match any entry on flow table 440-2 of middle node 414. Flow 4 therefore arrives at the table-miss flow entry, which has been modified to downlink 470-2.

At item (4), flow 4 works through flow table 440-3 of tail node 416, and again does not match any flow entry. It therefore arrives at the table-miss flow entry, which has been modified to "Punt to Controller." Tail node 416 therefore punts flow 4 back to controller 110.

At item (5), controller 110 determines that flow 4 did not match any flow entry in cascaded node chain 400. Checking its available nodes table 810, controller 110 determines that middle node 414 has available flow entries. Controller 110 therefore provisions in-use flow entry 4 910 on flow table 440-2. Controller 110 may now send flow 4 back to cascaded node chain 400 by forwarding flow 4 to head node 412. Flow 4 will now flow through flow table 440-1, and match flow entry 4 910 when it reaches this entry. Middle node 414 will therefore service flow 4.

Figure 10:
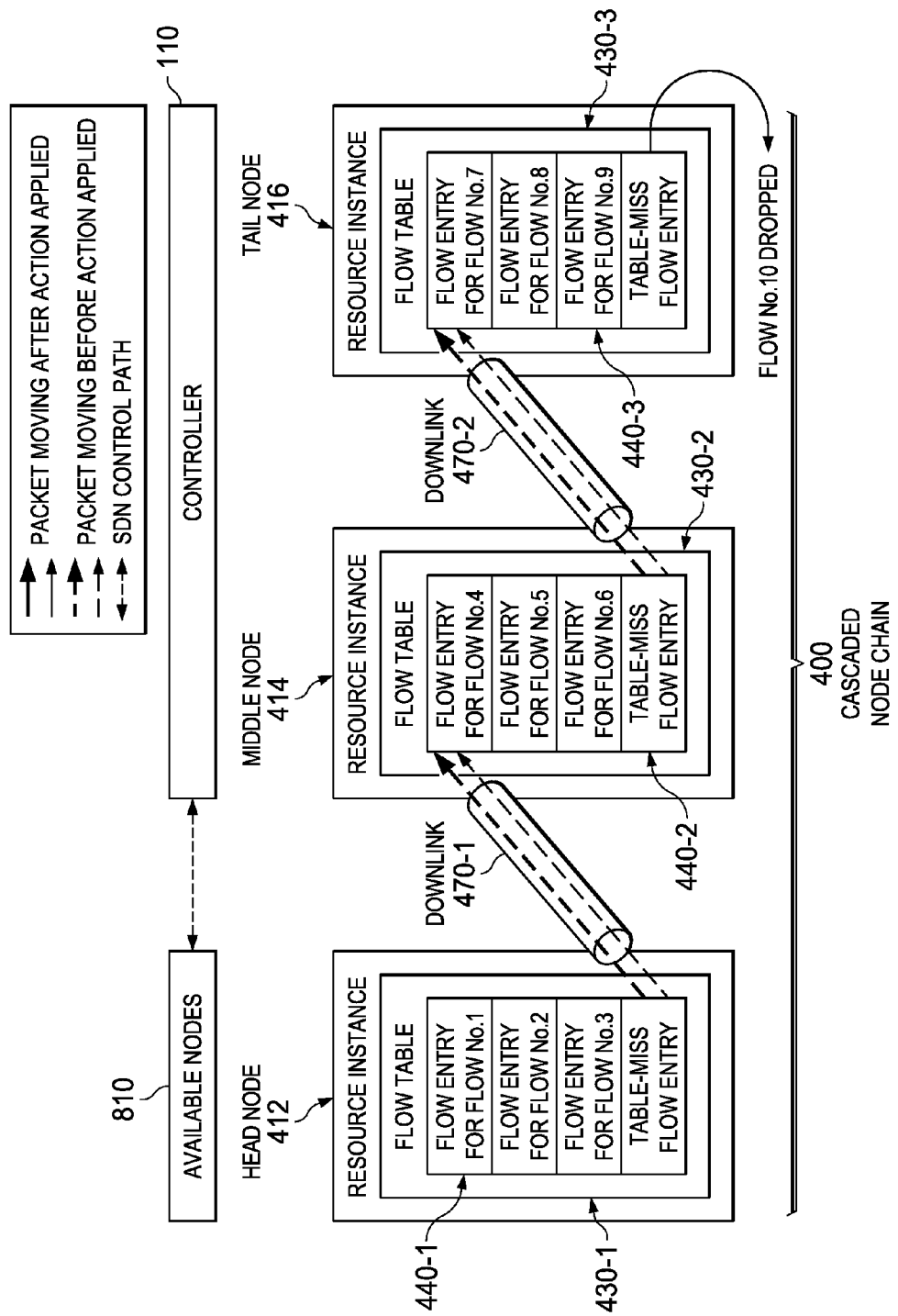
FIG. 10 is a block diagram of dynamic cascaded cluster according to one or more examples of the present Specification.

In FIG. 10, flow entries 4, 5, 6, 7, 8, and 9 have also entered cascaded node chain 400. These have been provisioned. Flow entries have been added for flow 5 and flow 6 on flow table 440-2 of middle node 414. Flow entries for flow 7, flow 8, and flow 9 have been added to flow table 440-3 of tail node 416.

Because the capacity of cascaded node chain 400 has now been reached, the action for the table-miss flow entry of flow table 440-3 on tail node 416 has been modified to "Drop." Thus, when flow 10 enters cascaded node chain 400, it works through head node 412, middle node 414, and tail node 416 in that order, and does not match any flow entry. Thus, flow 10 is dropped.

Figure 11:
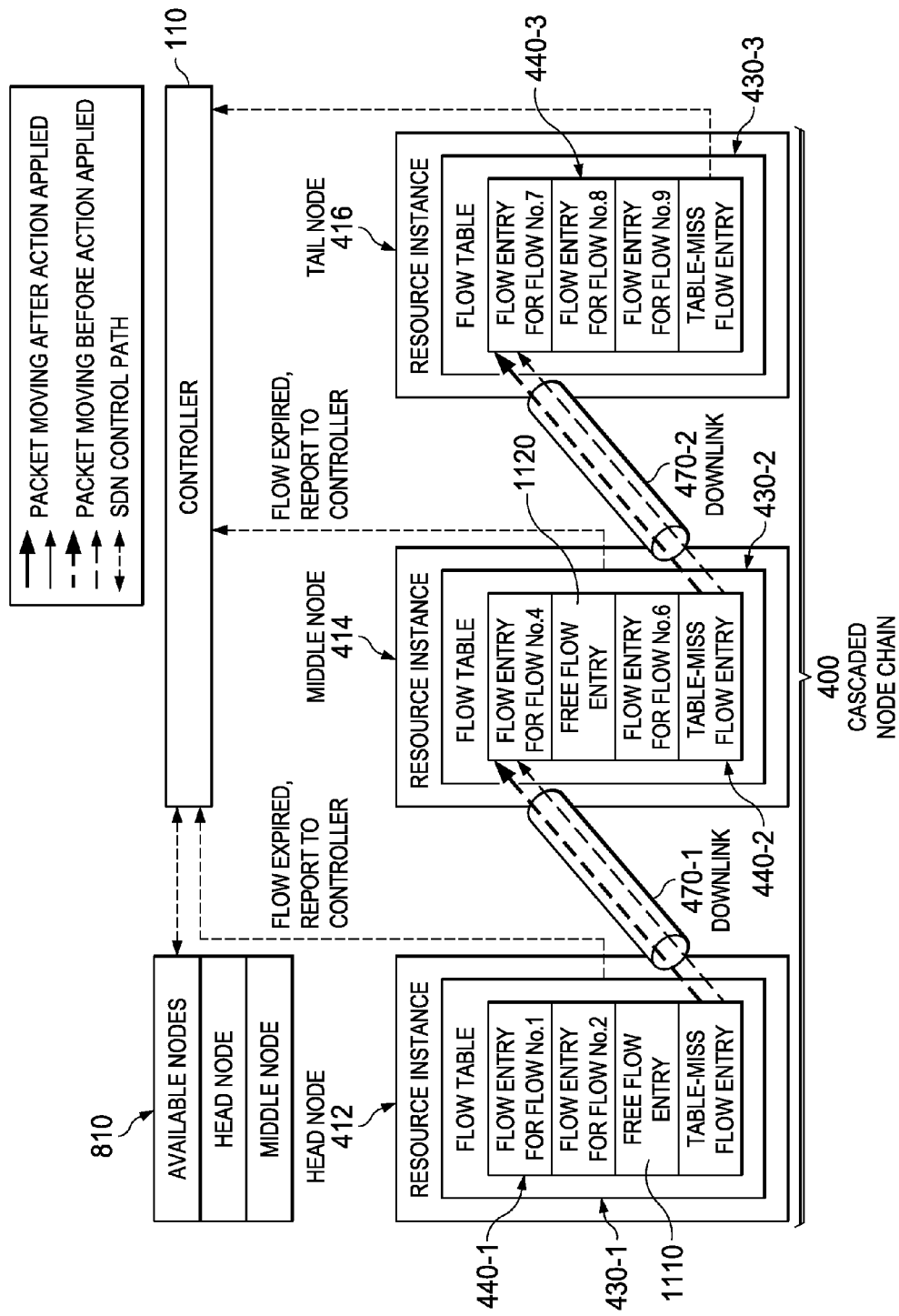
FIG. 11 is a block diagram of dynamic cascaded cluster according to one or more examples of the present Specification.

In FIG. 11, after a time, flow 3 and flow 5 expire. Thus, controller 110 may remove those flow entries, newly creating free flow entry 1110 on flow table 440-1 of head node 412, and free flow entry 1120 on flow table 440-2 of middle node 414. Because resources have been freed up on these nodes, controller 110 also updates available nodes table 810 by adding head node 412 and middle node 414 to the list. Note that packets of flows 1, 2, 4, and 6-9 will still traverse cascaded node chain 400 as before, and will still match their respective flow entries.

Figure 12:
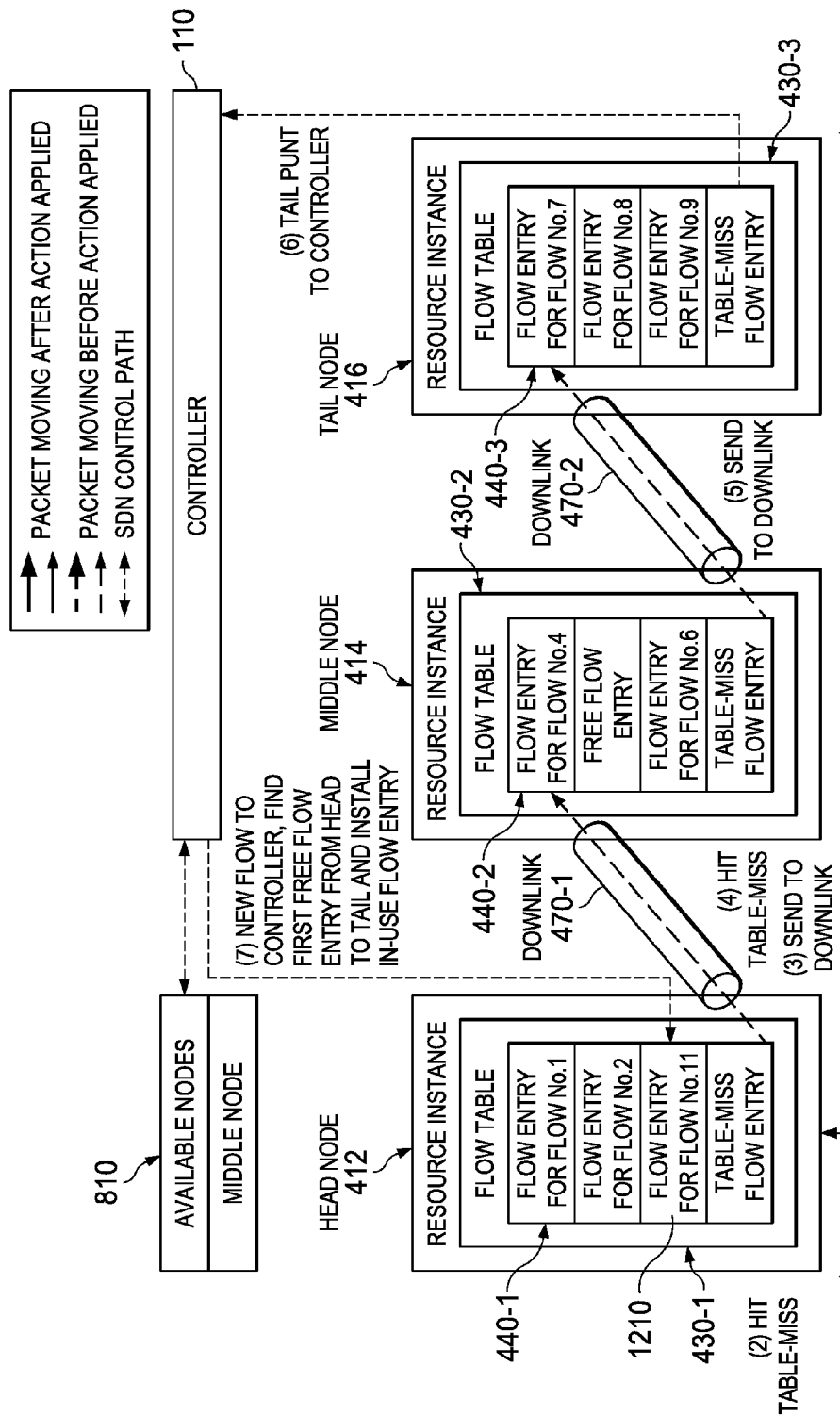
FIG. 12 is a block diagram of dynamic cascaded cluster according to one or more examples of the present Specification.

In FIG. 12, a new flow 11 arrives at cascaded node chain 400. Note that in this example, controller 110 is configured to keep track of existing flows.

At item (1), flow 11 is forwarded to head node 412. Flow 11 traverses all the entries of flow table 440-1, and does not find a match. Note that flow entry 1210 has not yet been provisioned (see FIG. 11), so this entry is currently a free flow entry that cannot match any flow.

At item (2), flow 11 hits the table-miss flow entry of flow table 440-1 of head node 412. The action for this entry has been modified to "Send to Downlink."

At item (3), head node 412 sends flow 11 to downlink 470-1.

At item (4), flow 11 also traverses flow table 440-2 of middle node 414 and does not match any entries. Flow 11 thus arrives at the table-miss flow entry of flow table 440-2 on middle node 414. Controller 110 has modified this entry to "Send to Downlink."

At item (5), middle node 414 sends flow 11 to downlink 470-2.

At item (6), flow 11 traverses flow table 440-3 of tail node 416, and does not match any flow entries. It thus arrives at the table-miss flow entry for this table. Controller 110 has modified this table-miss flow entry to "Punt to Controller." Thus, tail node 416 punts flow 11 to controller 110.

At item (7), controller 110 consults its available nodes table 810, and finds that head node 412 and middle node 414 have available flow entries (see FIG. 11). Controller 110 selects the first of these entries. The first entry available on the first node available is entry 1210 on flow table 440-1 of head node 412. Controller 110 therefore provisions entry 1210 to handle flow 11. Future instances of packets from flow 11 will now match flow entry 11 1210 on flow table 440-1 of head node 412. Because controller 110 has now exhausted the last available entry on head node 412, it removes head node 412 from available nodes table 810.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips. Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A network device comprising:
    a first network interface for communicatively coupling to a data network;
    a second network interface for communicatively coupling to a data plane configured to host a plurality of virtual network functions (VNFs) in a cascaded node chain, the cascaded node chain comprising a head node, a middle node, and a tail node providing instances of a single network function in a cascade fashion, wherein the head node is configured to receive external traffic; and
    one or more logic elements, including at least a processor and a memory, comprising a resource controller engine operable for:
        receiving a network flow via the first network interface, the network flow comprising data for matching the network flow to a resource instance in the cascaded node chain;
        sending the network flow to the data plane via the second network interface;
        receiving the network flow back from the data plane;
        determining that the network flow does not match a resource instance in the cascaded node chain;
        provisioning a free flow entry on a resource instance to match the network flow;
        determining that no network function instances on the data plane have a free flow entry;
        spawning a new network function instance on the data plane; and
        designating the new network function instance as a tail node.

2. The network device of claim 1, wherein the resource controller engine is further operable for re-sending the network flow to the data plane.

3. The network device of claim 1, wherein the resource controller engine is further operable for:
    designating each resource instance in the data plane as one of a head node, middle node, or tail node; and
    updating a table-miss flow entry on each head node and middle node to downlink to a next resource entry in the data plane.

4. The network device of claim 3, wherein the resource controller engine is further operable for:
    determining that an overall capacity of the data plane has not been exhausted; and
    updating a table-miss flow entry on the tail node to punt to a controller.

5. The network device of claim 3, wherein the resource controller engine is further operable for:
    determining that an overall capacity of the data plane has not been exhausted; and
    updating a table-miss flow entry on the tail node to drop.

6. The network device of claim 1, wherein the resource controller engine is further operable for providing a backup downlink between a first node on the data plane and a second node on the data plane, wherein the second node does not immediately follow the first node in the cascaded node chain.

7. A method of providing a virtualized network function, implemented on a processor and a memory, comprising:
    receiving a network flow via a first network interface, the network flow comprising data for matching the network flow to a resource instance in a cascaded node chain;
    sending the network flow to a data plane configured to host a plurality of virtual network functions (VNFs) in the cascaded node chain via a second network interface, the cascaded node chain comprising a head node, a middle node, and a tail node providing instances of a single network function in a cascade fashion, wherein the head node is configured to receive external traffic, and wherein the cascaded node chain has a separate data plane and control plane;

receiving the network flow back from the data plane;

determining that the network flow does not match a resource instance in the cascaded node chain;

provisioning a free flow entry on a resource instance to match the network flow;

determining that no network function instances on the data plane have a free flow entry;

spawning a new network function instance on the data plane; and designating the new network function instance as a tail node.

8. The method of claim 7, further comprising re-sending the network flow to the data plane.

9. The method of claim 7, further comprising:

determining that all resource instances on the control plane have exhausted their flow capacities;

spawning a new resource instance on the control plane; and designating the new resource instance as a tail node.

10. The method of claim 7, further comprising:

designating each resource instance in the data plane as one of a head node, middle node, or tail node; and updating a table-miss flow entry on each head node and middle node to downlink to a next resource entry in the data plane.

11. The method of claim 10, further comprising:

determining that an overall capacity of the data plane has not been exhausted; and updating a table-miss flow entry on the tail node to punt to a controller.

12. The method of claim 10, further comprising:

determining that an overall capacity of the data plane has not been exhausted; and updating a table-miss flow entry on the tail node to drop.

13. The method of claim 7, further comprising providing a backup downlink between a first node on the data plane and a second node on the data plane, wherein the second node does not immediately follow the first node in the cascaded node chain.

14. One or more tangible, non-transitory computer-readable mediums having stored thereon executable instructions operable for instructing a processor for providing a virtualized network function (VNF), comprising:

receiving a network flow via a first network interface, the network flow comprising data for matching the network flow to a resource instance in a cascaded node chain;

sending the network flow to a data plane configured to host a plurality of virtual network functions (VNFs) in the cascaded node chain over a second network interface, the cascaded node chain comprising a head node, a middle node, and tail node providing instances of a single network function in a cascade fashion, wherein the head node is configured to receive external traffic, and wherein the cascaded node chain has a separate data plane and control plane;

receiving the network flow back from the data plane;

determining that the network flow does not match a resource instance in the cascaded node chain;

provisioning a free flow entry on a resource instance to match the network flow;

determining that no network function instances on the data plane have a free flow entry;

spawning a new network function instance on the data plane; and designating the new network function instance as a tail node.

15. The one or more computer-readable mediums of claim 14, wherein the instructions are further operable for instructing the processor for re-sending the network flow to the data plane.

16. The one or more computer-readable mediums of claim 14, wherein the instructions are further operable for instructing the processor for:

determining that all resource instances on the control plane have exhausted their flow capacities;

spawning a new resource instance on the control plane; and designating the new resource instance as a tail node.

17. The one or more computer-readable mediums of claim 14, wherein the instructions are further operable for instructing the processor for:

designating each resource instance in the data plane as one of a head node, middle node, or tail node; and updating a table-miss flow entry on each head node and middle node to downlink to a next resource entry in the data plane.

18. The one or more computer-readable mediums of claim 17, wherein the instructions are further operable for instructing the processor for:

determining that an overall capacity of the data plane has not been exhausted; and updating a table-miss flow entry on the tail node to punt to a controller.

19. The one or more computer-readable mediums of claim 17, wherein the instructions are further operable for instructing the processor for:

determining that an overall capacity of the data plane has not been exhausted; and updating a table-miss flow entry on the tail node to drop.

20. The one or more computer-readable mediums of claim 14, wherein the instructions are further operable for instructing the processor for providing a backup downlink between a first node on the data plane and a second node on the data plane, wherein the second node does not immediately follow the first node in the cascaded node chain.

* * * * *